United States Patent Office 3,442,984
Patented May 6, 1969

3,442,984
O,O-(DI METHYL OR ETHYL)-S-(SUBSTITUTED ALLYLTHIOMETHYL) DITHIOPHOSPHATES
Heiner Dickhaeuser and Gunter Scheuerer, Ludwigshafen (Rhine), Heinrich Adolphi, Limburgerhof, Pfalz, and Gustav Steinbrunn, Schwegenheim, Pfalz, Germany, assignors to Badische Anilin- & Soda-Fabrik Aktiengesellschaft, Ludwigshafen (Rhine), Germany
No Drawing. Filed Mar. 3, 1966, Ser. No. 531,331
Claims priority, application Germany, Mar. 18, 1965, B 81,038
Int. Cl. C07f 9/02; A01n 9/36
U.S. Cl. 260—948                      5 Claims The present invention relates to dithiophosphoric esters, particularly unsaturated halogen-containing dithiophosphoric esters, having a good fungicidal action. The invention further relates to a method of controlling insects with these phosphoric esters.

It is an object of this invention to provide new and valuable dithiophosphoric esters which have a strong insecticidal action. Another object of the invention is to provide a method for controlling insects with these phosphoric esters so that the insects are destroyed using only small amounts of the active substance.

It is already known in United States specifications Nos. 3,020,305 and 3,080,276 to use as insecticides compounds having the general formula $$\begin{array}{c} R^1-O \\ \phantom{R^1-}\diagdown \\ \phantom{R^1-O}P \\ \phantom{R^1-}\diagup \phantom{X}\diagdown \\ R^2-O \phantom{XXX} X''-A-S-R^3 \end{array}\!\!=\!\!X'$$

in which $R^1$ denotes a lower alkyl radical, $R^2$ denotes a lower alkyl radical, $X'$ denotes an oxygen atom or a sulfur atom, $X''$ denotes an oxygen atom or a sulfur atom, A denotes an alkylene radical, preferably methylene, and $R^3$ denotes a halogen-substituted alkene-(2)-yl radical.

We have now found that the new dithiophosphoric esters having the general formula $$\begin{array}{c} R-O \phantom{XX} S \\ \phantom{R-}\diagdown \phantom{X}\diagup\!\!= \\ \phantom{R-O}P \phantom{XXXXXXXXXX} Y \\ \phantom{R-}\diagup \phantom{XX}\diagdown \phantom{XXXXXXX}\diagup \\ R-O \phantom{XXX} S-CH_2-S-CH_2-C\!\!=\!\!C \\ \phantom{XXXXXXXXXXXXXXXXX} | \phantom{XX} \diagdown \\ \phantom{XXXXXXXXXXXXXXXXX} X \phantom{XXX} Z \end{array}$$

in which R denotes a methyl radical or an ethyl radical, X denotes a methyl radical or a bromine atom, Y denotes a chlorine atom or a bromine atom and Z denotes a hydrogen atom or a chlorine atom, have good insecticidal and acaricidal action.

The compounds to be used according to this invention may be prepared by methods which are known per se, for example by reacting an appropriately substituted chloromethylhaloallyl sulfide having the formula $$\begin{array}{c} \phantom{XXXXXXXXXXXXXXXX} Y \\ \phantom{XXXXXXXXXXXXXX}\diagup \\ ClCH_2-S-CH_2-C\!\!=\!\!C \\ \phantom{XXXXXXXXX} | \phantom{XXX} \diagdown \\ \phantom{XXXXXXXXX} X \phantom{XXX} Z \end{array}$$

in which X, Y and Z have the above meanings, with a salt of an O,O-dialkyldithiophosphoric acid.

Examples of salts are the alkali metal, ammonium and alkaline earth metal salts, and also the salts of organic bases, for example triethylamine or pyridine. Examples of acids are O,O-dimethyldithiophosphoric acid and O,O-diethyldithiophosphoric acid.

Chloromethyl - (3,3 - dichloromethallyl) sulfide and chloromethyl-(2,3-dibromoallyl) sulfide are examples of chloromethylhaloallyl sulfides which in turn may be prepared from the corresponding haloallylmercaptans with formaldehyde and hydrogen chloride.

The following description, given by way of example, illustrates the production of the new compounds according to this invention:

20.6 parts (parts by weight) of chloromethyl-(3,3-dichloromethylallyl) sulfide is added to a solution of 19.8 parts of sodium-O,O-dimethyldithiophosphate in 50 parts of acetone and, when the weakly exothermic reaction has ended, the whole is boiled under reflux for another four hours. The whole is then cooled and the deposited common salt is separated from the solution, and the acetone is substantially distilled off from the filtrate. The residue is taken up in 100 parts of chloroform, washed with water and dried over sodium sulfate. The solvent is removed in vacuo. 27.2 parts of a yellowish oil remain; $n_D^{25}=1.572$.

The substance has the formula (1)
$$\begin{array}{c} CH_3O \phantom{XX} S \\ \phantom{X}\diagdown \phantom{X}\diagup\!\!= \\ \phantom{XX}P \\ \phantom{X}\diagup \phantom{XX}\diagdown \\ CH_3O \phantom{XXX} S-CH_2-S-CH_2-C\!\!=\!\!CCl_2 \\ \phantom{XXXXXXXXXXXXXXXXXXXX} | \\ \phantom{XXXXXXXXXXXXXXXXXXXX} CH_3 \end{array}$$

The following compounds may be obtained in an analogous way:

(2)
$$\begin{array}{c} C_2H_5O \phantom{XX} S \\ \phantom{X}\diagdown \phantom{X}\diagup\!\!= \\ \phantom{XX}P \\ \phantom{X}\diagup \phantom{XX}\diagdown \\ C_2H_5O \phantom{XXX} S-CH_2-S-CH_2-C\!\!=\!\!CCl_2 \\ \phantom{XXXXXXXXXXXXXXXXXXXX} | \\ \phantom{XXXXXXXXXXXXXXXXXXXX} CH_3 \end{array}$$
pale yellow oil $n_D^{25}=1.558$ (3)
$$\begin{array}{c} CH_3O \phantom{XX} S \\ \phantom{X}\diagdown \phantom{X}\diagup\!\!= \\ \phantom{XX}P \\ \phantom{X}\diagup \phantom{XX}\diagdown \\ CH_3O \phantom{XXX} S-CH_2-S-CH_2-C\!\!=\!\!CHBr \\ \phantom{XXXXXXXXXXXXXXXXXXXX} | \\ \phantom{XXXXXXXXXXXXXXXXXXXX} Br \end{array}$$
orange yellow oil $n_D^{25}=1.606$ (4)
$$\begin{array}{c} C_2H_5O \phantom{XX} S \\ \phantom{X}\diagdown \phantom{X}\diagup\!\!= \\ \phantom{XX}P \\ \phantom{X}\diagup \phantom{XX}\diagdown \\ C_2H_5O \phantom{XXX} S-CH_2-S-CH_2-C\!\!=\!\!CHBr \\ \phantom{XXXXXXXXXXXXXXXXXXXX} | \\ \phantom{XXXXXXXXXXXXXXXXXXXX} Br \end{array}$$
orange brown oil $n_D^{25}=1.589$ The active substances, obtained as oils, may be processed into suspension, solutions, emulsifiable concentrates, spreading powders and dusting powders by adding extenders, solvents, emulsifying agents or other assistants and used in these forms. They may also be mixed with other plant protection agents, for example insecticides.

The agents according to this invention have a good action on insects, for example mosquito larvae, such as *Aedes aegypti*, *Culex* spec. and *Anopheles* spec., cockroaches, aphids and spider mites, for example *Tetranychus bimaculatus* (two-spotted spider mite) and *Paratetranychus pilosus* (red spider mite).

The use of the agents according to this invention is illustrated in the following examples in which the following substances are used for comparison:

U.S. patent specification No. 3,080,276

EXAMPLE 1

(A)
$$\begin{array}{c} C_2H_5O \phantom{XX} S \\ \phantom{X}\diagdown \phantom{X}\diagup\!\!= \\ \phantom{XX}P \\ \phantom{X}\diagup \phantom{XX}\diagdown \\ C_2H_5O \phantom{XXX} S-CH_2-S-CH_2-C\!\!=\!\!CH_2 \\ \phantom{XXXXXXXXXXXXXXXXXXXX} | \\ \phantom{XXXXXXXXXXXXXXXXXXXX} Cl \end{array}$$

U.S. patent specification No. 3,080,276

EXAMPLE 5

(B)
$$\begin{array}{c} C_2H_5O \phantom{XX} S \\ \phantom{X}\diagdown \phantom{X}\diagup\!\!= \\ \phantom{XX}P \\ \phantom{X}\diagup \phantom{XX}\diagdown \\ C_2H_5O \phantom{XXX} S-CH_2-S-CH_2-CH\!\!=\!\!CHCl \end{array}$$

EXAMPLE 3

(C)
$$\begin{array}{c} C_2H_5O \phantom{XX} S \\ \phantom{X}\diagdown \phantom{X}\diagup\!\!= \\ \phantom{XX}P \\ \phantom{X}\diagup \phantom{XX}\diagdown \\ C_2H_5O \phantom{XXX} S-CH_2-S-CH_2-CH\!\!=\!\!CCl_2 \end{array}$$

EXAMPLE 12

(D) 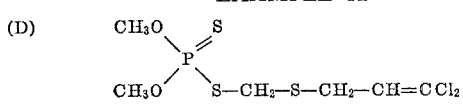

EXAMPLE 11

(E) 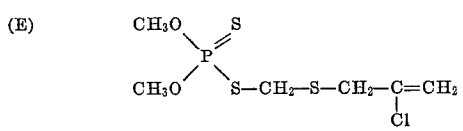

EXAMPLE 9

(F) 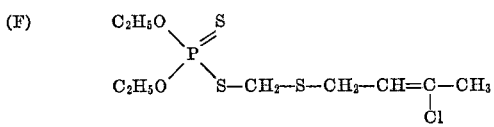

(G) 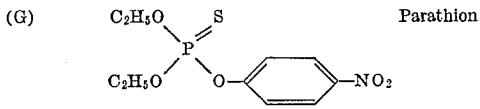 Parathion (H) 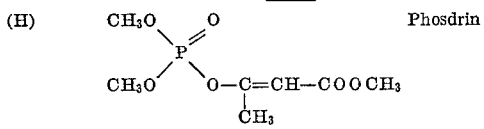 Phosdrin (I) 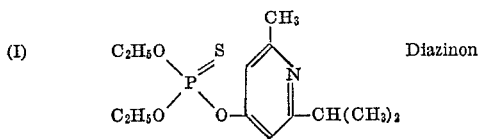 Diazinon

EXAMPLE 1

Test on mosquito larvae

Fourth-stage larvae of the yellow-fever mosquito (*Aedes aegypti* L.) are exposed to the action of the test substances in clean water. The mortality rate is determined twenty-four hours later. Concentrations which destroy more than 80% of the test insects within the said period are classified as effective.

The results are given in the following table:

| Active substance: | Effective concentration in p.p.m. |
|---|---|
| 1 | 0.01 |
| 3 | 0.02 |
| 4 | 0.02 |
| A | 0.05 |
| B | 0.05 |
| C | 0.05 |
| D | 0.05 |
| E | 0.05 |
| F | 0.05 |
| G | 0.04 |
| H | 0.05 |
| I | 0.25 |

EXAMPLE 2

Spider mite test

Topped bush beans, which exhibit marked attack by two-spotted spider mites (*Tetranychus bimaculatus*) and an abundant deposit of eggs, are sprayed with an aqueous formulation of the active substance until they are dripping wet. The concentration which kills more than 95% of all mites and with which no viable fresh larvae emerge from the eggs during the next twelve days are regarded as effective. The results are given in the following Table:

| Active substance: | Effective concentration in percent of weight |
|---|---|
| 1 | 0.01 |
| 2 | 0.01 |
| 4 | 0.01 |
| B | 0.025 |
| C | 0.025 |
| D | 0.05 |
| E | 0.025 |
| F | 0.025 |
| I | [1] 0.025 |

[1] Only effective for a short time.

We claim:

1. A compound having the formula:

$$\begin{array}{c} R-O \\ \phantom{R-O}\diagdown \\ \phantom{R-O}P=S \\ \phantom{R-O}\diagup \\ R-O \phantom{xxx} S-CH_2-S-CH_2-C=C \diagup Y \diagdown Z \\ \phantom{xxxxxxxxxxxxxxxxxxxxxxxx} | \\ \phantom{xxxxxxxxxxxxxxxxxxxxxxxx} X \end{array}$$

in which R denotes a member selected from the group consisting of methyl and ethyl, X denotes a member selected from the group consisting of methyl and bromine, Y denotes a member selected from the group consisting of chlorine and bromine and Z denotes a member selected from the group consisting of hydrogen and chlorine.

2. A compound having the formula:

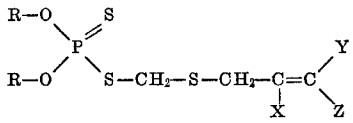

3. A compound having the formula:

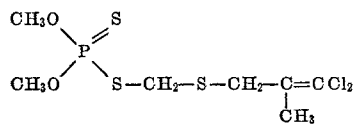

4. A compound having the formula:

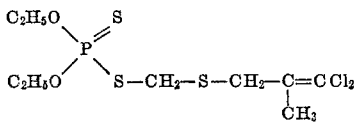

5. A compound having the formula:

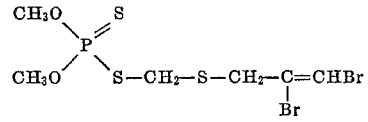

References Cited

UNITED STATES PATENTS 3,077,432   2/1963   Chupp et al. ----- 260—948 XR
3,080,276   3/1963   Chupp ---------- 260—948 XR CHARLES B. PARKER, *Primary Examiner.*

A. H. SUTTO, *Assistant Examiner.*

U.S. Cl. X.R.

260—978; 424—216